May 12, 1931.  J. SALOMONE  1,805,011
COMBINATION HOUSEHOLD IMPLEMENT
Filed May 22, 1929
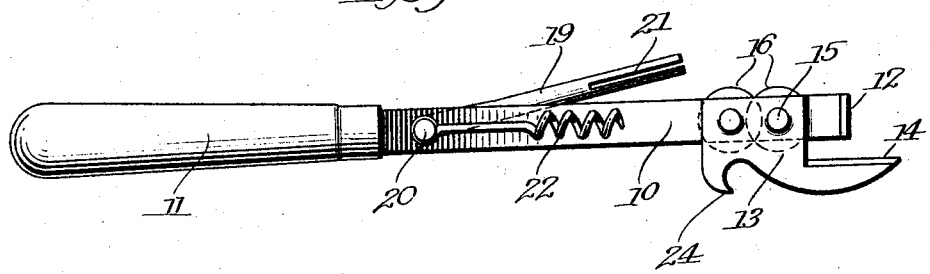
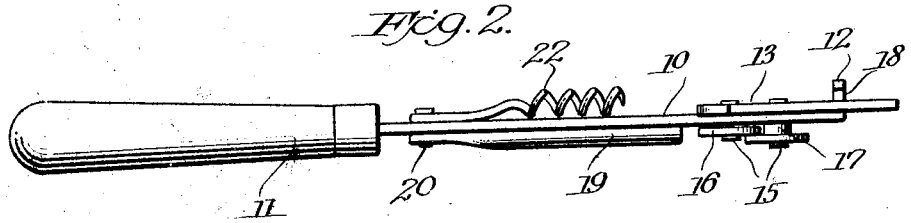
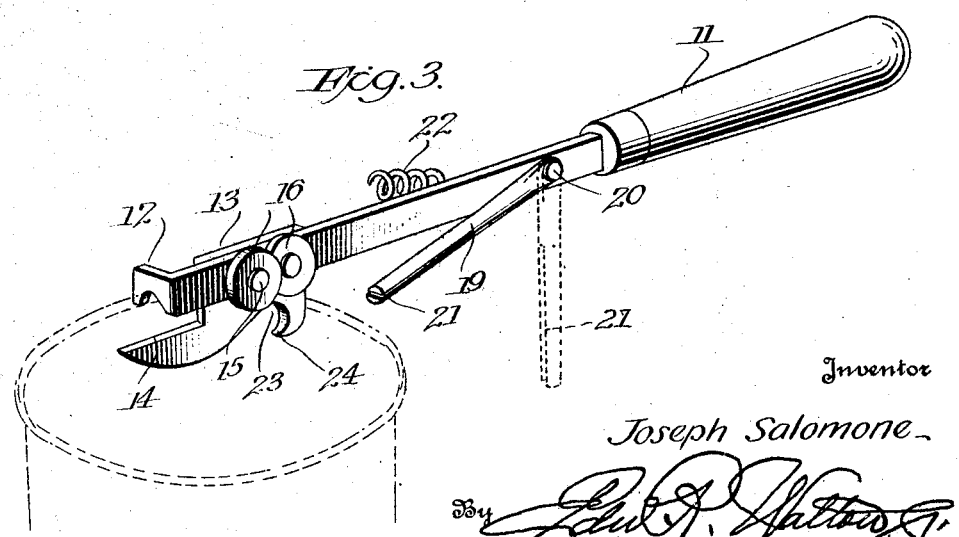
Inventor
Joseph Salomone
By [signature]
Attorney Patented May 12, 1931

1,805,011

UNITED STATES PATENT OFFICE

JOSEPH SALOMONE, OF BROOKLYN, NEW YORK

COMBINATION HOUSEHOLD IMPLEMENT

Application filed May 22, 1929. Serial No. 365,160.

The present invention is a combination household implement adapted principally for culinary purposes.

The object of the present invention is to provide a combination tool as above described which may be used for opening various kinds of containers such as cans, bottles and the like, and wherein a very simple and economical construction is provided while at the same time being very convenient and desirable to handle, and which affords greater leverage requiring less strength and exertion in operation.

Other purposes of the invention, more or less specific than those referred to above, will be in part obvious and in part pointed out in the description of elements, combination and arrangement of parts and application of principles constituting the invention, and the scope of the protection contemplated will be indicated in the appended claims.

In the accompanying drawings which show the preferred embodiment of the invention as at present devised:

Fig. 1 is a side elevation of the tool or implement of the present invention;

Fig. 2 is a bottom line view of the device shown in Fig. 1; and

Fig. 3 is a perspective view of the implement of the present invention and showing the cutter in operation in one of its uses.

In the following description and accompanying drawings, like characters will denote similar and like parts throughout the several views.

Referring to the drawings in detail, 10 denotes a shank consisting of a metal bar, preferably rectangular in cross-section, one end of the bar having a cylindrical handle 11 formed or mounted thereon and providing an extension of the bar in the general direction of its length. The other end portion of the bar is bent on a line transversely of the greatest width thereof to form a lateral extension 12 preferably at right angles to the body portion of the bar. A plate 13 is positioned in juxtarelation against the face of the bar behind said lateral extension 12 and spaced for a distance from said extension, this plate having a knife blade 14 extending forwardly therefrom to underlie the extension 12 and project beyond the same.

The plate 13 is held in position by two spaced rivets 15 extending through the same and through said shank 10. These rivets also carry on their ends, respectively, discs 16 which are positioned at the side of the shank 10 opposite the plate 13. One of said discs lies against the shank 10 and the other disc is spaced from the shank by an interposed collar or spacer 17 and overlapping the peripheral edge of the other disc so as to provide knife-sharpening rollers in a manner well understood in the art, but these rollers also have an additional function which will be presently described.

The lateral extension 12 on the shank 13 is formed with a notch 18 in its edge opposite the knife blade 14, said notch being offset outwardly with respect to the blade 14, or in other words, is positioned to lie at one side of the blade 14 nearer the free extremity of the extension 12, so as to engage or straddle the upstanding rib usually found at the circumferential edge of cans, thereby guiding the tool in its travel around the circumferential marginal portion of the top of can during the cutting operation as indicated in Fig. 3.

The discs 16 also serve the purpose of engaging the top of the can on the other side of the kerf being made by the blade 14 to steady the opener and to act as a stop to prevent the can top from raising above its normal plane during the cutting operation.

It will be further observed that a novel construction is provided by securing the cutter blade 14 and the discs 16 in position by the same rivets or fastening members.

Some types of cans may be opened by what is known as "ripping" and are usually opened by a key which initially engages a tab on the can top and which is to be ripped off by a rolling movement of the key as is well known in the art. The present invention provides a permanent key which is accessible at all times even though the key which is usually sold with such a rip strip can is lost. To this end, an elongated piece of metal 19 is provided and pivotally mounted, as at 20, to the shank 10 adjacent the inner end of the handle 11. The free end of this key is slotted from its extremity inwardly for a distance, as at 21, thus providing a key which will receive in the slot 21 the usual tab of a rippable can top.

In operation, the key 19 is preferably moved to the dotted line position shown in Fig. 3 so that the handle member 11 will form a crank affording greater leverage for the easy manipulation of the key.

For convenience, a cork-screw 22 is provided on the side of the shank opposite the key 21 and is pivotally held in position by the rivet or bolt 20 which secures the key in position. The key 19 and cork screw 22 may assume a normal inoperative position by being moved substantially parallel with the shank 10.

The rear portion of the plate 13 which extends below the shank 10 is formed with an inwardly curved recess 23, the rear wall of which has a forwardly projecting finger 24. The recess 23 and finger 24 cooperate in the removal of crimped bottle caps and the like in a manner well understood in the art.

From the above it will be manifest that a very simple, desirable, durable and effective implement is provided which may be manufactured at a very low cost.

In this specification and the annexed drawings, the invention is disclosed in the form in which it is considered to be the best, but the invention is not limited to such form because it is capable of being embodied in other forms; and it is to be understood that in and by the claim following the description herein, it is intended to cover the invention in whatever form it may be embodied within the scope thereof.

Having thus described my invention what is claimed as new and upon which it is desired to obtain Letters Patent of the United States is:

In a tool of the kind described, a shank having a handle at one end and having the other end portion extending laterally thereto, a plate secured to the side of said shank behind said lateral extension and spaced rearwardly therefrom, said plate having a cutter blade thereon underlying and projecting beyond said extension, overlapping discs positioned on the side of said shank opposite said plate, means extending through the axis of said discs, said shank and said plate for molding said parts together; said discs extending beyond the side edges of said shank, said extension having a notch in the edge thereof opposite said blade and positioned to one side of said blade.

In testimony whereof I have hereunto set my hand.

JOSEPH SALOMONE.